United States Patent [19]
Schuster

[11] 3,764,593
[45] Oct. 9, 1973

[54] BACTERIOCIDAL NON-CORROSIVE BIODEGRADABLE COMPOSITION AND METHOD OF MANUFACTURING SAME

[76] Inventor: Dietrich Schuster, Am Bergborn 160, Frankfurt Upper Palatinate, Germany

[22] Filed: Aug. 28, 1968

[21] Appl. No.: 755,978

Related U.S. Application Data

[63] Continuation-in-part of Ser. No. 545,127, April 25, 1966, Pat. No. 3,429,909, which is a continuation-in-part of Ser. No. 413,366, Nov. 23, 1964, abandoned.

[52] U.S. Cl. ................ 260/97.5, 260/102, 260/462
[51] Int. Cl. ............................................. C09f 1/04
[58] Field of Search ............... 260/97.5; 11/462, 11/102

[56] References Cited

UNITED STATES PATENTS

| | | | |
|---|---|---|---|
| 2,408,332 | 9/1946 | Morgan | 260/462 |
| 2,441,063 | 5/1948 | Gilmann | 260/97.5 |

*Primary Examiner*—Donald E. Czaja
*Assistant Examiner*—William E. Parker
*Attorney*—Staas, Halsey & Gable

[57] ABSTRACT

Boron- and nitrogen-containing reaction product is obtained by reacting boric acid, a secondary amino-alcohol and a carboxylic acid, under specified conditions. Products are bacteriocidal, non-corrosive and biodegradable, and can be dissolved, dispersed or emulsified in water.

12 Claims, 2 Drawing Figures

BACTERIOCIDAL NON-CORROSIVE BIODEGRADABLE COMPOSITION AND METHOD OF MANUFACTURING SAME

RELATED APPLICATIONS:

This application is a continuation-in-part application of application Ser. No. 545,127, filed Apr. 25, 1966 (now U.S. Pat. No. 3,429,909) which, in turn, is a continuation-in-part of application Ser. No. 413,366, filed Nov. 23, 1964. The latter application has been abandoned.

The present invention relates to compositions, and to a process for the manufacturing of such substances, which are bacteriocidal, non-corrosive, act as wetting agents, and are bio-degradable upon dilution with water. The new compositions are particularly useful as cooling and lubricating agents, for example, as cutting fluids in the metal working industry, but also have desirable cleaning properties and can thus be used as detergent concentrates.

Recently, efforts have been made to improve the working of metal, particularly metal cutting and metal forming, by better cooling and lubrication. Synthetic substances, based on water as a coolant have decided advantages over hydrocarbon or oil derivative products. The cooling properties of water are far superior to those of other products, paricularly when the surface tension of the water is decreased by the use of wetting agents. Water alone is however not useful due to its corrosive action, particularly when known wetting agents have been added, as well as due to its lack of lubricating effectiveness.

Various proposals have been made to develop cutting fluids based on water by use of additives. For example, soaps added to water have been used, particularly soaps which are derived from amino alcohols, with additives of higher sulfonated, or unsulfonated fatty acids of napthenic acids, or from carboxylic acids, obtained from the oxidation of hydrocarbons.

The use of ethanolamine based soaps is particularly advantageous because, in a watery solution, a pH value of above 9 is readily obtainable, and thus they do have some corrosion inhibiting effect. The corrosion inhibiting effect can be increased by adding other acids or salts, in order to increase the buffering action. Additives described in the literature include, for example, alkylsulfoneamidocarboxylic acid, and its salts; and boric acid and its salts.

The corrosion resistant effect of such aqueous cooling and lubricating substances is further improved by adding sodium nitrite which is recommended as an additive for almost all aqueous products. Unfortunately, sodium nitrite is extremely poisonous. In actual practice, sodium nitrite is usually added in quantities of from one to 10 percent to the concentrates used for cutting fluids. From the point of view of the health of the worker at the machine, in which the fluids are used, this is an undesirable additive. The lethal dosage for an adult human is only four grams of sodium nitrite. Lethal poisonings in adults are observed primarily in connection with food and food preservation; nevertheless, cutting fluids used on the machines do leave a spray or a mist from time to time which are inhaled by the machine operators and may cause anemia and low blood pressure, as well as damage to the blood circulatory system, and even in small doses may cause or contribute to liver damage due to the formation of nitro compounds.

Known substances, in many variations and in combinations with buffering agents and sodium nitrite as a corrosion inhibiting agent, have substantial disadvantages, entirely apart from the poisonous aspect of the sodium nitrite itself. One of these disadvantages is that fatty acids used in such soaps form salts which are difficult to dissolve in combination with alkali metals, and may cause precipitates which eventually cloud the solutions or result in scum; at its worst, they may interfere with the disposition of the colloidal solutions themselves. Therefore, and in order to stabilize such precipitates, various proposals have been made to stabilize such aqueous solutions. One of such proposals is to add a non-ion forming emulsifier, in order to disperse the difficulty soluble calcium salts. These non-ionic emulsifiers or wetting agents are, chemically, condensation products of alkyloxides with various organic substances, for example polyetheralcohols, fatty alcohol polyglycolethers, fatty acid amido polyglycolethers or fatty acid polyglycolesters. Typical examples are: octylphenyl-polyetheralcohol mixed in with the above-identified substance; a non-ionic forming condensation product derived from amines with ethylene oxide; and a monobutylether of a condensation product of an alkyloxide with ethanolamine.

The above described mixtures have good wetting and dispersion properties and also impart good corrosion resistance. Further additives are used in order to increase the lubricating effectiveness to provide for bacteriocidal and fungicidal effect and to prevent foaming. Non-aromatic oil distillates are often added in order to improve the lubricating effectiveness. It order to provide for bacteriocidal and fungicidal properties, and particularly in order to suppress the growth of anaerobic bacteria, additives consisting of phenol, cresol, or triazine derivitives are used, or highly antiseptic chlorine compounds. Yet, bacteriocidal and fungicidal additives at times contribute to dermatological disease. Some investigators, active in industrial medicine, regard these additives as a most usual case of industrial dermatosis. Entirely apart from the susceptibility of several operators to these additives, they are undesirable because they inhibit the growth of bacteria not only in the material itself, but also in settling tanks and in the streams and rivers to which industrial wastes are often, unfortunately, conducted, since they prevent biological degradation and cause pollution.

The compositions according to the present invention are inherently not poisonous. Thus, they have the property of bacteriocidal and fungicidal effect in the concentrations used in the metal working industry; these bacteriocidal and fungicidal effects are lost, however, when the compositions are diluted to the extent customary in a settling tank. Upon such substantial dilution, they become biologically degradable. Further, the compositions of the present invention have insecticidal and insect repellent effects so that not only the agents causing decomposition and dermatosis are inhibited, but the carriers of bacteria, that is primarily flies, are not found in the environment where the new compositions are used. Nevertheless, the compositions are non-toxic to humans and do not cause skin irritations.

It is an object of the present invention to provide compositions which are bacteriocidal and non-corrosive and which have the desirable lubricating properties of oil-based cutting fluids while retaining the desirable cooling properties of water-based cutting fluids, without any of the disadvantages of either fluids.

It is further an object of the present invention to provide cutting fluids which are medically acceptable to the operator of the machine on which the fluids are used, that is fluids which are bacteriostatic, fungicidal and yet non-poisonous. It is a further object of the present invention to provide a metal working fluid which is biologically degradable so that it will not present disposal problems but may be discharged into public rivers and streams without causing pollution or endangering fish or plant life.

It is yet another object of the present invention to provide compositions which have detergent and cleaning properties, are readily soluble, bacterio-static, and yet biologically degradable when sufficiently diluted.

Briefly, in accordance with the present invention, at least two molar proportions of a secondary aminoalcohol are reacted with one molar proportion of boric acid ($H_3BO_3$) or an analog thereof (preferably 3:1 to 5:1) at a temperature varying from about 130°C.; water formed in the reaction is removed from the resulting reaction system, whereby a boron-and nitrogen-containing reaction product is obtained. This reaction product can then be reacted with a carboxylic acid at a temperature of from about 150°C. to about 230°C., with water being again removed from the reaction system, whereby a bacteriocidal, non-corrosive, boron- and nitrogen-containing reaction product is obtained. The latter reaction product is also a wetting agent and is characterized by the property of being biodegradable when diluted with a substantial quantity of water.

The reaction of the aminoalcohol with the boric acid may be done in the presence of glycols in the range of from 0.1 or less, to about 10 molar proportions of the glycol for each molar proportion of aminoalcohol. The product thus obtained is less viscous, easier to dilute with water to a working cutting fluid solution and, by suitable choice of the glycol, provides smoother cut surfaces when used as a cutting fluid in a machine tool operations.

As indicated, molar proportions of secondary aminoalcohol and boric acid and reaction temperatures are important factors in the production of the desired reaction products. The exact composition of the said products is not fully clear at this time, such that exact chemical formulae cannot be ascribed to them. However, it appears that by careful control of reaction temperature within the ranges given above, and by using certain acids, it is possible to form piperazine compounds and to isolate the same from the remainder of the reaction products. This represents a further embodiment of the present invention. Reaction temperatures are controlled to from about 160°C. to about 230°C., and saturated or unsaturated carboxylic acids having a chain length of $C_{12}$ to $C_{22}$ are used in the reaction of aminoalcohol, preferably diethanolamine, and boric acid. This is illustrated below in the examples.

Water is formed in the initial reaction stage between a secondary aminoalcohol and boric acid. For each mol of boron compound used, at least one and not more than three mols of water are formed. And water is also formed during the second reaction stage in which a carboxylic acid participated. It is a characteristic of this second stage that there is formed at least one mol of water for each mol of fatty acid charged.

As contemplated herein, analogs of boric acid include: $HBO_2$, $H_2B_4O_7$ and $B_2O_3$, as well as their corresponding salts, esters and halogen compounds. Preferred, however, is boric acid ($H_2BO_3$).

Aminoalcohols used herein are represented by the general formula

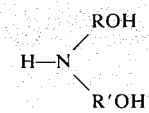

wherein R and R' are either the same or different bivalent aliphatic groups ($-CH-$; $-CH_2-CH_2-$, etc.), which may have one or more side chains or substituents therein. Preferably, the length of the chains R and R' are similar and contain from one–six carbon atoms. Typical compounds are diethanolamine and diisopropanolamine. Particularly preferred is diethanolamine.

It is also contemplated that a tertiary aminoalcohol, as triethanolamine, can also be used together with a secondary aminoalcohol. In all such instances, the secondary compound is used in greater quantity than the tertiary compound.

Carboxylic acids of a wide variety can be used in forming reaction products coming within the framework of this invention. The acids can be saturated or unsaturated and contain at least about 8, preferably from about 12 to about 22, carbon atoms per molecule. Typical acids are lauric, myristic, palmitic, stearic, oleic, and tall oil acids, napthenic acids and phthalic acid. Generally, from about 0.5 to about 3 molar proportions of carboxylic acid are used per molar proportion of boric acid.

The invention is illustrated by the following examples:

Example 1: Production of an intermediate reaction product containing boron and nitrogen is illustrated by this example.

94.5 g (9 mols) of di-beta-hydroxyethylamine (diethanolamine) are mixed at a temperature of about 100°C. with 122 g (2 mols) of pulverized or granular boric acid ($H_3BO_3$) in a retort of about 2 liter capacity. The retort is connected with a descending cooler and provided with an electrical mixer. Mixing is continued until the entire boric acid is dissolved. Thereafter, under strong heating, a condensation reaction is started, which begins at a temperature of about 130°C., at which the reaction mixture begins to boil and water is split off. The water of reaction is collected in the descending cooler in a measuring vessel. With a period of about 45 minutes to one hour, the temperature of the reaction mixture is raised to a temperature of about 230°C., and about 100 to 108 ml. of water is formed and is distilled off. This corresponds to approximately 6 moles of reaction water; that is, approximately 3 mols of water are obtained per mol of boric acid.

Thereafter, the reaction mixture is subjected to vacuum distillation in order to determine how much di-beta-hydroxyethylamine are obtained, having a boiling point of about 160° – 165°C. This indicates that the condensation reaction according to the example provides a composition in which one mol boric acid has reacted with two moles of di-beta-hydroxyethylamine.

The reaction product obtained after the vacuum distillation is a clear, honey-colored substance which, as it cools, becomes glassy. If this substance is heated to the point of just melting, and stirred with a glass rod, the crystalline form of the reaction product is obtained.

The product showed the following analytical composition (carbon and hydrogen determination according to Liebig):

Carbon, 42.1–42.5 percent
Hydrogen, 8.8–9 percent
Nitrogen, 11.7–12 percent (Dumas)
12.2 percent (Kjeldahl)
Boron, 4.5–4.8 percent (determined as boric acid after saponification with hot, fuming hydrochloric acid).

Example 2: 1,260 g (12 mols) of di-beta-hydroxyethylamine (diethanolamine) are mixed with 244 g (4 mols) of boric acid in powder or granular form in a 2.5 liter retort, provided with a heating jacket, a distillation head and a descending cooler, and an electrical stirring mechanism. Mixing temperature is about 100°C. and mixing is continued until all of the boric acid is dissolved. Thereafter, the condensation reaction is started under substantial heating as in Example 1, which reaction begins at about 130°C. Water is split off. The water of reaction is condensed over the descending cooler and collected in a measuring vessel. As before, in about 45 minutes to one hour the reaction temperature is raised to about 230°C., and about 210 to 216 ml. of water are split and distilled off. Thereafter, heating is discontinued and the reaction mixture is permitted to cool to a temperature of about 160°C. Heating is commenced again and at the same time 280 g of tall oil (a mixture of fatty acids) at a temperature of 160°C. are added to the reaction mixture, for example through a separate tube. Mixing is started rapidly in order to provide for quick intermingling of the substances in the retort. After addition of the tall oil, the inlet through which it was added is closed. When the mixture reaches 180°C., the second step of the condensation reaction starts. Within a period of about 2 hours, 65 to 72 ml. of water are split off. The temperature should not exceed 230° to 240°C.

The thus obtained reaction mixture is permitted to cool to a temperature of about 80° to 120°C, and is then poured into a vessel containing 1,350 g of distilled water. The reaction mixture and the water are mixed and a thick honey-like liquid, similar to an emulsion and having a pleasant smell, similar to esters, is obtained. A non-aromatic hydrocarbon fraction, in accordance with the following specification, is added to this emulsion under constant stirring, until a completely clear viscuousyellow, pleasantly fruity smelling liquid is obtained. For complete clearing of the solution which is initially similar to an emulsion, 80 to 160 g of the hydrocarbon are necessary.

Specification of the hydrocarbon fraction is: Specific gravity, 15°C., 0.805; Boiling point: 244°–332°C.; Refractive index, 1445; Flash point, 106°C.; iodine number, 0.03; Aniline point, 91°C.

Instead of this hydrocarbon fraction, other mineral oil fractions, glycols, polyglycols, fatty acid amides, polyesters, polyethers, silicones, or other substances which are capable of changing the emulsion to a clear liquid with an addition of at the most 20 percent of such material, may be used.

The concentrate according to Example 2 is completely soluble in any proportion with water, remains clear, hardly foams, and does not form precipitates with hard water. It is an ideal cooling-lubricant-and detergent concentrate which can be used, diluted in water, up to 0.05 percent.

Example 3: First reaction step: The first reaction step is carried out as in Examples 1 and 2, reacting: 630 g diethanolamine (6 mols) and 122 g boric acid, $H_3BO_3$ (2 mols); with formation of 108 g water (6 mols).

Second reaction step: The second reaction step is carried out as in Example 2, lauric acid (200 g.; 1 mol) is added. Water of reaction split off comprised 54 g. (3 mols).

The reaction product is soluble in water, is clear, and has strong wetting properties. Preferably it is thinned in a proportion of about 1:1 with distilled water and forms a clear, water-soluble, cooling, lubricating and detergent concentrate. In order to improve the buffering action, two percent of the hydrocarbon described in Example 2, or an organic or inorganic acid with a dissociation constant of less than $5 \times 10^{-4}$ can be added.

Example 4. First reaction step: As in Example 3.

Second reaction step: Similar to Example 3, however, utilizing 288 g of myristic acid, during 20 minutes and at a temperature of 225°C. 58 g of water (3.2 mols) are condensed out.

The reaction product thus obtained is soapy and solid. When heated and thinned with distilled water in the proportion of 1:1, it is a stable emulsion which can be further diluted with water. The product, diluted with water 1:1, has good cooling, lubricating, and detergent properties, and good corrosion inhibiting effects.

A clear, water soluble product, can be made by adding (in parts by weight): 90 parts of the product diluted 1:1 in the above Example 4; 25 parts oil and 10 parts fatty acid polydialkylamide.

Example 5. First reaction step: As in Example 3.

Second reaction step: Addition of 256 g (1 mol) of palmitic acid at 200°C., within thirty minutes; and condensing off 58 g (3.2 mols) water.

The product has a soapy character, and is soluble in water up to 80° C. giving a clear solution. At further cooling, the substance becomes a stable pasty emulsion, which can be diluted further as a cooling, lubricating or detergent substance.

In order to make the product easier to handle, a stock solution thinned with water, 1:1, may be mixed with 70 parts (by weight) of oil.

Example 6. Step 1: As in Example 3.

Step 2: Starting mixture: 300 g of a mixture of saturated $C_{14}$-$C_{22}$ carboxylic acids (10 parts). To the starting mixture are added 53 parts of saturated $C_{18}$ carboxylic acid and 35 parts of saturated $C_{20}$-$C_{22}$ carboxylic acid, at 220°C. during 50 minutes, and 67 g (3.7 mols) of water are condensed off.

The reaction product is soapy, is soluble up to 80°C. in a 1:1 proportion in water forming a clear solution. If cooled further, a stable pasty emulsion results, which can be diluted with water to form a cooling, lubricating or detergent substance.

Example 7. Reaction step 1: As in Example 3.

Reaction step 2: 280 g (1 mol) of purified oleic acid is added at 220°C. in a period of 25 minutes. 50 g of water (2.8 mols) are condensed off.

The reaction product, when solidifying, becomes a honey-like substance which, when diluted with distilled water in a proportion of 1:1, form a concentrate for cooling, lubricating, and detergent use, and can be fur- Example 8. Reaction step 1: As in Example 2.

Reaction step 2: Similar to Example 2; however, instead of tall oil, 280 g (1 mol) of purified oleic acid is added during a period of 60 minutes at 200°C. and 94 g (5.2 mols) of water are formed and removed.

The above product is a particularly useful concentrate for cooling, lubricating and cleaning use, when diluted 1:1 with water. Ten percent of a hydrocarbon fraction, as described in Example 2, may be added.

Example 9. 630 g (6 mols) diethanolamine are mixed with: 180 g (3 mols) boric acid, at approximately 100°C., and then 420 g (approximately 1.5 mols) of tall oil, mixed fatty acids, are added.

The reaction between the diethanolamine and the boric acid starts at 130°C. While adding heat, the temperature is driven during a period of about 30 minutes, to 220°C.; 192 g (10.6 mols) of water are condensed off. In another vessel, a hot mixture of 315 g (3 mols) of diethanolamine and 300 g (2 mols) of triethanolamine, at a temperature of 220°C., is added to the first reaction product. Reaction is continued for about 30 minutes, and 70 g (3.9 mols) of water are split off.

The reaction product is dissolved in distilled water in a proportion of 1:1 and forms, either in its pure form or if mixed with a hydrocarbon fraction, according to Example 2, an excellent, lubricating and detergent concentrate.

As mentioned above, one embodiment of the invention involves preparation of reaction products, the complete composition of which is not known but which contain piperazine compounds. Careful control of reaction temperature and inclusion of a carboxylic acid in the reaction of aminoalcohol and boric acid makes this possible. This feature is illustrated below in Examples 10 and 11.

Example 10. 840 g (8 mols) diethanolamine are mixed with 247 g (4 mols) of boric acid, at approximately 100°C. 560 g (approximately 2 mols) of tall oil are added. The resulting mixture is carefully heated to a temperature of about 135°C. Heating is then slowed, and controlled such that the mixture reaches a temperature of 150°C. in approximately 30 minutes. Thereafter, the mixture is heated substantially so that it reaches a temperature of 230°C. within a further period of about 60 minutes. 310 g (17.3 mols) of water are condensed out.

The reaction product is soluble in water in a proportion of 1:1 and forms an excellent cooling, lubricating and detergent concentrate. Isolation of 1, 4 di-beta-hydroxyethylpiperazine from the reaction product, by repeated recrystalizing from methoxy-hexanol (4-methoxy-4-methyl-pentanol-2) can be done, to obtain it in its pure form.

Example 11: 50 g of the pure, undissolved reaction product of Example 10 are digested with 200 g methoxyhexanol at 100°C. for 15 minutes and are decanted off while hot from the undissolved resinous residue. The hot solution is permitted to cool, and a sticky mass is separated out which cannot be filtered. After about 24 hours, the remainder of the solution is poured off, and is reduced to about half volume in vacuum. Double the amount of benzene ether is added; after about 2 hours the layer forming on the bottom, and the solvent are decanted off, and the first, contaminated crystalline fraction is obtained. By recrystallization it can be purified. From the top layer, a very pure fraction is obtained. About 6 g of the material, having a melting point of 130°C. are obtained. Analysis and infra-red spectrum determination confirm the identity of the product as I,4 di-beta-hydroxyethylpiperazine.

Example 12: Using apparatus as described in Example 2: 840 grams (8 mols) diethanolamine are dissolved at about 100°C. in 244 grams (4 mols) boric acid, until a clear solution is obtained.

Thereafter, 240 grams (2 mols) ethyleneglycol monoethylether is added and the resulting reaction mixture is heated while being stirred well. This reaction starts at about 130°C, while water is being split off. The split-off water is collected in a descending measuring cooler vessel. After about 45 minutes to an hour, the reaction temperature is raised to 205° – 210°C., until a total amount of 210 – 216 ml water is split off. Without interrupting the heating, 280 grams (1 mol) fatty acid, e.g. oleic acid, at a temperature of about 130°C. are added, for example through a tube; (it is observed that the temperature in the reaction vessel will fall to about 190°C.). As stated, heating is continued and the reaction with the fatty acid will start at about 195°C.; in a period of about 20 minutes, 54 ml (3 mols) water are condensed off, and a final temperature of 220°C. is reached.

The product thus obtained is honey yellow, pours easily and may be used as a ready, water soluble, clear, cooling and lubricating substance.

To provide a cutting fluid concentrate, fifty parts of the product obtained in accordance with Example 12 are mixed with 45 parts water and 5 parts of hydrocarbon, as described above in connection with Example 2. The product has excellent rust-inhibiting characteristics and all the other characteristics heretofore described.

Example 13: Starting ingredients and steps are as above in Example 12 until the point at which, at 205°C., 216 ml water are split off (same reaction conditions and quantities of diethanolamine, boric acid, and diethyleneglycol monoethylether).

Then, one mol of hot triethanolamine is added and thereafter at least one mol water is condensed off. As above described, one mol (280 g) of oleic acid is added and 3 mols (54 ml) water are condensed out. Final temperature is approximately 200°C. The product obtained is thick and honey-like, and is an excellent emulsifier.

Example for a cutting fluid concentrate: 50 parts of the product in accordance with Example 13 are mixed with 20 parts of spindle oil and 30 parts of water. The resulting product is a clear, easily mobile liquid which easily dilutes clear in water to form working solutions and has excellent rust-inhibiting properties.

Example 14: Similar to Example 13, but instead of one mol of triethanolamine, one mol (61 g) of monoethanolamine is added. All other conditions are the same, even the water being split off and the final temperature.

The product is slightly opaque when dissolved in water, and can be used as such as a cutting fluid.

Example 15: A mixture of diethanolamine and boric acid, in the same quantities as in Example 12; thereafter, 360 gram (3 mols) of diethyleneglycol monoethylether is added. The mixture is heated to about 205°C, and 216 ml water are distilled off. Without interrupting the heating, as described, 280 grams of oleic acid (1 mol) are added, heated in about 30 minutes to 220°C.

and kept at that temperature for about 30 minutes. 4 mols of water (72 ml) are distilled off.

The product without addition of hydrocarbons is liquid, clearly soluble and may be used directly in water as a concentrate; and further it is readily thinned with water in proportions of 1:30 to 1:50 to give a viscous clear working solution. The product has particularly good cutting fluid properties, that is, it is particularly good as a lubricant coolant and leaves a smooth cut.

Examples 16: Quantities of diethanolamine and boric acid, as described in Example 12, are dissolved when hot. Thereafter, 268 grams (2 mols) of diethyleneglycol monoethylether are added and heated as above described. After 50 minutes a temperature of 200°C. is reached. 216 ml water are distilled off. Then, as described, 560 grams(2 mol) of oleic acid are added and, in a period of 20 minutes, 4 mols water are condensed off at a temperature of between 190°C. and 210°C. The resulting product is liquid and is an excellent emulsifier.

To form a concentrate, 50 parts of the resulting product are mixed with 30 parts water and 20 parts hydrocarbon, as described in connection with Example 2. There is formed a clear, honey-yellow thin liquid which can be further diluted with water to form working solutions, remains clear, and has excellent rust-inhibiting properties.

Example 17: Proceeding exactly as in Example 16 above, but instead of diethyleneglycol monoethylether, 236 grams (2 mols) of diethyleneglycol monobutylether are used. A concentrate may be made as above described in connection with Example 16.

Example 18: 1,260 grams (12mols) of diethanolamine are mixed with 244 grams (4 mols) of boric acid, as described, an initial reaction temperature is 130°C; thereafter, the resulting mixture is heated to a temperature of 240°C. and 216 ml water are condensed off. The reaction mixture is left to cool and, when at 180°C., a mixture of 280 grams (1mols) of oleic acid, and 320 grams (2 mols) of diethyleneglycol monobutylether, are added. The combined reaction mixture is heated again. The reaction starts at about 250°C. The reaction temperature is kept during a period of time of about 1 ½ hours at 220°C. by regulating the heating. In this period, 125 g water (7 mols) are condensed off.

The product is liquid and clearly soluble in water, and this form provides an excellent cooling and cutting fluid concentrate.

Other glycols which, by experiment, have been tested for suitability are: Ethyleneglycol mono isopropylether, Ethyleneglycol mono butylether, Ethyleneglycol mono ethylether, Diethyleneglycol mono ethylether, Trioxypropane, Sorbitol.

Comparative Example A: 210 grams (2 mols) of diethanolamine and 61 grams (44 mols) of boric acid were mixed and then within 1½ hours were heated from 100°C. to 200°C. at a pressure of 12 pounds per square inch gauge (psig) in a heating jacket vessel with agitation. Water in a quantity of 40 milliliters (2.2 mols) was evolved from the resulting reaction mixture and was collected. The reaction mixture was allowed to cool to about 125°C. Oleic acid, 460 grams (2 mols), was then added to the cooled reacted mixture. With vigorous agitation, the vessel contents were maintained at 125°C. at a pressure of 12 psig pressure for 2 hours. No water evolved from the resulting reaction mixture and the product, when cooled to room temperature (about 21°C.), congeals to a dark brown, opaque, viscous, jellied-soap-like composition.

The product is soluble when added to water, forming milky solutions. When added to a hard water (one containing calcium salts), a lime soap is formed. Aqueous solutions having a 1:40 volume ratio of product to water have a pH value of 8.5.

Metal chip test samples immersed in an aqueous solution containing the product in a 1:40 ratio, were subjected to the rust test described hereinbelow. The metal samples had a rust rating of:

top     12 spots
bottom   25 spots

Example 19: This Example illustrates the present invention and is given by way of comparison wth Comparative Example A, above.

The procedure of Comparative Example A was repeated through to evolution and collection of 40 milliliters (2.2 mols) of water. The reaction mixture then at 200°C. was cooled to 160°C. rather than to 125°C. as in A. The reaction mixture was maintained at 160°C. and at a pressure of 12 psig for 2 hours while being stirred vigorously. Water in a quantity of 32 milliliters (1.8 mols) was evolved and collected.

When the resulting product is cooled to about 21°C. it is a brown, viscous, clearly transparent solid. It is not soluble in water, but it is dispersed in water with the aid of vigorous agitation. A dispersion containing 1 part by volume of the product and 40 parts by volume of water has a pH of 7.0. Metal chip test samples immersed in an aqueous dispersion containing the product in a 1:80 ratio, were subjected to the said rust test. The metal sample did not rust; the spot ratings were:

top } no rust.
bottom

Comparative Example B: The following reactants were used:

oleic acid     280 grams (1 mol)
boric acid     20 grams (0.3 mol)
diethanolamine     105 grams (1 mol).

The three reactants were mixed together in a retort equipped with a descending condenser, whereupon they warmed up to 50°C. as a result of the resulting heat of neutralization. The resulting reaction mixture was maintained at 50°C. under a pressure of 5 mm. pressure for 1½ hours. The resulting product was a thick, paste-like soap. No water was evolved from the reaction.

The product is soluble in water forming a strong foaming solution. When diluted with water to a volume ratio of 1:40, it has a pH value of 8.5. When this dilute solution is used in the said rust test, the metal chips rusted had a rust rating of:

top     5 spots

The product can be used with a maximum water dilution of 1:30.

Example 20: This Example also illustrates the present invention and is given by way of comparison with Comparative Example B, above.

The procedure described in Comparative Example B was repeated except that the reaction temperature was maintained at 150°C. and at a pressure of 5 mm. for 1½ hours. Water in a quantity of 24 milliliters (1.3 mols) was evolved during the reaction which occurred and was collected.

The product is not soluble in water but is dispersible therein. The aqueous dispersions thereof have only a mild foaming effect. When diluted with water to a volume ratio of 1:40, the resulting dispersion has a pH value of 8.5 When this dispersion was used in the same rust test, no rust developed on the test metal chips; the rust rating was:

top  
bottom  } no rust.

The product can be used with a water dilution of 1:60.

The characteristics of the reaction products obtained according to the Examples above will now be described, with reference to the accompanying drawings in which.

Figure 1:
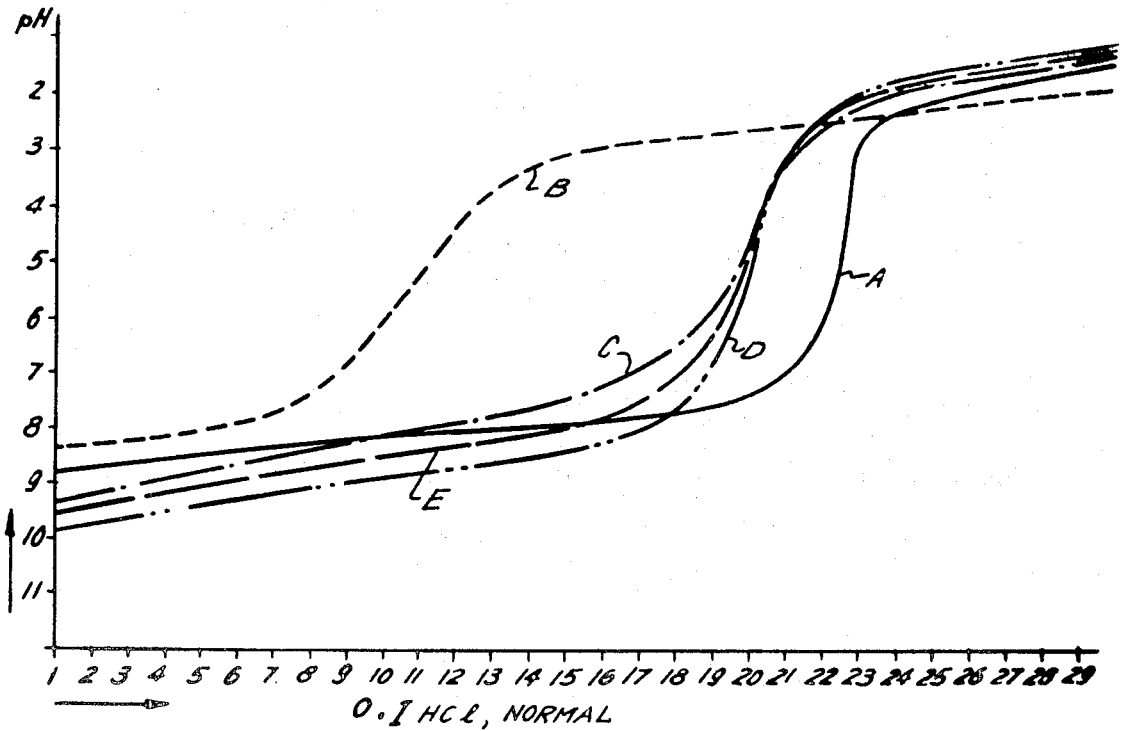
FIG. 1 is a family of titration curves in which the ordinate represents pH values and the abscissa 0.1 normal hydrochloric acid.

The compositions of the present invention have substantial buffering action, and may be referred to as broad spectrum buffers. They are distinguished from known mixtures of buffering agents in that they do not cause precipates with calcium-containing water even in a one per cent water solution. With a pH range between 9 and 7, they are still capable of capturing 21 milliliters of 0.1 normal hydrochloric acid, as shown by titration curve A1 of FIG. 1. A different product, the formula of which is indicated in FIG. 1 of the drawing with respect to curve C, having molecular proportions of 2:1 of triethanolamine and boric acid salts could capture only 13.5 Milliliters of N/10 hydrochloric acid.

Referring again to the curves of FIG. 1, and particularly to titration curve B: a desired reaction product obtained in accordance with Formula II of the boric acid salt of the 1,4-di-beta-hydroxyethylpiperazine can capture twelve milliliters of 0.1 normal hydrochloric acid at the neutral point of pH7, or 0.1 normal of sodium hydroxide, without any change in pH value. This is also seen by extreme position of the two titration curves A and B. Titration curves C, D and E illustrate the results achieved with different compounds, the composition of which is indicated on the right hand of FIG. 1.

In general it may be stated that the pH value of the solutions is below 9, which is particularly important to prevent skin irritation. The rust inhibiting effect of the broad spectrum buffering substances of the present invention is conjoined with the buffering effect itself, which can be shown by experiments to be described.

The corrosion inhibiting effect of boric acid triethanolamine salts, in a molecular proportion of 2:1, is compared with the reaction product obtained in Example 1, as well as with boric acid salts of the 1,4 di-beta-hydroxyethylpiperazine.

Test conditions: Milling machine chips of cast iron, for example of 3.47 percent carbon, 2.33 percent silicon, 0.77 percent manganese, 0.29 percent phosphorus and 0.116 percent sulphur are obtained by dry machining. The chips are approximately 5–7 mm, long and have a thickness of about 1 mm. A small heap of about 40 mm. (1.6 inches) diameter and about 8–10 mm, high is placed on a watch glass of about 10 cm. (4 inches) diameter.

A solution of the substance to be tested, in distilled water, is prepared and poured over the heap of chips so that the chips are completely wetted. Thereafter, excess solution is poured off by tilting the watch glass, so that only so much of the solution remains as is coated on the chips. This little heap of chips is left alone at a temperature of about 18° to 20°C. and in ordinary humidity of 50 to 60 percent. The test for rusting is done by first considering the aspect of the chips from the top, to determine if there has been any rust formation; if there is then Table I will indicate "Yes;" if not then "No." If no rust is formed, a further inspection is done by observing the chips from below, through the watch glass and making the following determination:

No rust No  
Below 5 spots Minimal  
Below 25 spots Small  
About 25 spots Yes

THE ATTACHED TABLE I

Table I clearly shows that the corrosion inhibiting effect of the products to be compared is parallel with the buffering effect described in connection with the curve of FIG. 1. Substance No. 3 (first column Table I) is the reaction product obtained in Example I; this does not show any rust formation even in a dilution of 1 percent with a pH below 9. Rusting occurs even at the 4 percent solution of triethanolamine and boric acid, when the pH value of 9 is exceeded. Even the 1,4 di-beta-hydroxyethylpiparazine, although it has a lower pH value, has a better corrosion inhibiting effect than triethanolamine, which is particularly apparent when the "acid salts" of the bases with boric acid are compared, that is the results of Substances Nos. 4 and 8 of Table I. The substances, which are compared, have an "alkaline" N-atom corresponding to one each "acidic" boron atom. In spite of the lower pH value, the use of 1,4 di-beta-hydroxyethylpiperazine salts improves the rust inhibiting effect (Substance No. 8).

The unusual character of a reaction product such as that obtained in Example I is indicated by titration curve A in FIG. 1. It is seen that the titration curve does not change, even when the solution has been boiled for 2 hours. If the product would hydrolize, then titration curve A would change to have the shape of titration curve B, which shows the behavior of a watery solution, of equal percentage contents, of diethanolamine and boric acid (mol proportion 2:1). This, however, is not the case. The reaction product of Example I is saponified only by very strong acids, for example smoking hydrochloric acid. If the reaction conditions are properly arranged, boric acid can be obtained again practically quantitatively in crystalline form. This method can be used in order to determine the boric acid content in the compound.

The substances of the present invention have desirable biological characteristics; they are bacteriostatic, and fungicidal, when in the concentration under which they would normally be used; but when diluted substantially with water, they become bacteria-degradable.

Tapping fluids, based on mineral oils, may cause dermatalogical irritations, for example causing oil-acne (J.E. Dalton, J. American Medical Association, 1951, pages 147 etseq; and W. Morris and C.M. Maloof, New England Medical Journal, 1952, pages 247 and 440). Besides the oil itself, additives often added to oil base cutting fluids cause additional irritation; such additives may be alkaline soaps, petroleum sulfonates, or other emulsifier to make the mineral oil products water emulsifiable or water soluble. Experiments have shown, that the reactionsproducts of the examples given above, do not cause irritation to the human skin when diluted to the extent useful in the metal working industry. The experiments were made with persons working in the industry, and who already were sensitized to metal working cutting fluids. The following solutions were prepared:

1. A 1 percent solution according to Example 1;
2. A 1 percent solution according to Example 2;
3. A 1 percent solution of pure 1,4- di-beta-hydroxyethylpiperazin made according to Examples 10 and 11.

Small patches were applied to the skin of the persons testing the material; the patches were permitted to remain for 24 hours. The test volunteers, before having the patches applied, were subject to the following dermatological diseases: dermatitis; eczema; mycotic eczema and infective eczema; sporyasis; lichen ruber and pityriasis rosea.

After 24 hours, no reaction was noted in any one of the patches; no irritation to the skin under the patches could be determined.

BACTERIOSTATIC EFFECTS

Cooling fluids prepared on the basis of emulsified hydrocarbons are particularly subject to bacterial attack, which occur primarily in the form of anaerobic bacteria, which attack the sulfone groups of the emulsifiers. These sulfone groups are reduced and poisonous, foul smelling, hydrogen sulfide is liberated. This also, of course, decomposes the cooling oil. In order to prevent decomposition, air can be bubbled through the solution continuously, or buffering additives may be used. The use of additives, or air, is costly. In contrast, the reaction products of the present invention do not contain any sulfur, or sulfur compounds, and thus such anaerobic bacteria do not have any medium to grow on. Reaction products of the present invention have bacteriocidal, fungicidal and insect repellant (and to some extent insecticidal) properties; they are effective against gram-positive, as well as against gram-negative bacteria. They inhibit the growth of bacteria, as well as parasitic fungi, and are repellents for the carrier of these bacteria and fungi, mainly insects and particularly flies. The bacteriacidal, fungicidal and insecticidal properties are obtained without the addition of chemical compounds usually used for such purposes, such as halogens, phosphorus, or metal-containing compounds.

Experimental Basis for Tests for Bacteriacidal Effect

A growing medium of blood agar is infected with bacteria, as listed below, by applying thereon small bits of filter paper, of about 9 mm. diameter. The growing medium was left for 24 hours at 30°C. The test solution was prepared according to Example 2.

Results:

| Dilution of reaction Product according to Example 2 | Staphylococcus (Gram-positive) | Bacterium Prodgiosum (Gram-Negative) |
| --- | --- | --- |
| 5% | Effective Inhibition | Effective Inhibition |
| 1% | Effective Inhibition | Effective Inhibition |
| 1/10% | Little Inhibition | Little Inhibition |

The experiments showed that in dilutions in which the substance is used in the ordinary metal working industry, namely down to 1% and somewhat less, a strong and effective bacteriacidal effect is obtained. As the dilution increases, the substance can be bacterially attacked, and is thus biologically degradable.

To test for inhibition of growth of parasitic fungi, an experimental arrangement similar to that for the bacterial test was used. The results are shown in Table II.

TABLE II

| Name of Fungus | % dilution of Reaction Product of Example 1 | Limit of Growth Inhibition |
| --- | --- | --- |
| Botrytis cinerara | 0.5% | No growth |
| | 0.1% | No growth |
| | 0.05% | No growth |
| | 0.02% | Growth from 0.02% |
| Pseudopeziza tracheifila | 1.0% | No growth |
| | 0.1% | No growth |
| | 0.02% | Growth from 0.02% |
| Alternaria tennis | 1.0% | No growth |
| | 0.1% | No growth |
| | 0.02% | Growth from 0.02% |

The dilution limit at which growth still occurs is less than with bacteria, namely at between 0.02 and 0.01 of the concentrate.

It has been found that concentrations of the reaction product down to 0.5% have insecticidal effect, and at even greater dilutions the reaction product still acts as an insect repellant. Thus, the carriers of disease and irritation, particularly flies, are not attracted to equipment utilizing a cooling fluid according to the present invention. The data of Table II, and the experiments show that a reaction product of the present invention, without any additives used in the insecticidal or fungicidal field, and without any poisons, inherently has bacteriacidal, fungicidal and insecticidal effects when used in the concentrations best suited for metal working, for example, as a cutting fluid. When the substance is, however, diluted, as for example in a settling tank, or in a disposal system, that is when it is present in concentrations below 0.02%, and for example 0.001%, it not only loses all its bacteriacidal effects, but on the contrary becomes bacteriologically degradable. It thus can be disposed of without causing pollution of river, lakes, or waterways.

METAL WORKING UTILITY:

For practical use as a cooling lubricating and detergent concentrate for use in the metal working industry, for example as a cutting fluid, as a fluid for use in lubrication for rolling or drawing of sheet, or wire, for lathe turning, drilling and boring, tapping, and grinding, a concentrate of a reaction product is diluted with water. The separate machines are preferably supplied from a central storage system, as is well known in the art, in which the proper dilution for the use of the machinery can be maintained. It has been found that, as cutting fluids, for example for use in a lathe, the reaction products of the present invention made according to the above examples 2 to 11, are best utilized in a concentration which is above 0.1% and preferably in a region of from 1 to 3% of the substance, with the remainder water. The high degree of dilution of the concentrate permits efficient utilization of the cutting fluid.

In order to test the lubricating effectiveness, various lubrication tests have been devised. Since the reaction products of the present invention are particularly useful in lathe cutting and grinding, where the contact of the tool with the work piece is not ordinarily along a point but rather over a broader area, for example ideally a line, a test apparatus to test lubricating effectiveness under simulated conditions is described. Reference may also be had to "Schmiertechnik" No. 4, pages 184–191; 1956, article by Bartel et al.

Figure 2:
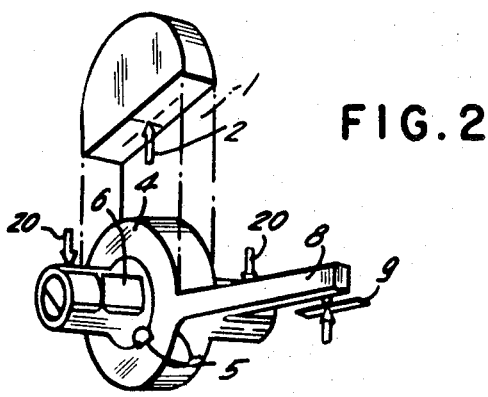
FIG. 2 is an illustration of a testing apparatus to test broad area lubricating effectiveness.

Referring now to FIG. 2: A test bolt 6 is inserted into a holding ring 4. Test bolt 6 is supported within the holding ring 4 on a pair of flattened pins 5, which are held against rotation within the holding ring 4. The test bolt 6 is arranged to be rotated. Holding ring 4, with its pins 5, is suspended by means of a steel band 1 from a holder 10. The relative pressure of pins 5 against the test bolt 6 can be adjusted as indicated schematically by arrows 2, 20. Holding ring 4 is provided with a lever 8, which bears against a scale schematically indicated at 9.

The suspension by steel band 1 is such that the pins 5 are exactly parallel to the axis of text bolt 6. The test bolt is best made from a carbon steel C-15, with about 0.1 micron roughness; it may have a diameter of about an inch and a hardness of 63 Rockwell. The pins 5 are offset 45° from either side of a vertical center line; the pressure of the pins against the test bolt, that is the forces schematically indicated by arrows 2, 20, are about 4,500 Kg/cm²; the relative speed 0.2 meters/per sec. (for a 1 inch test bolt, this corresponds to a speed of about 150 rpm).

At the beginning of the test, a pure line contact is obtained between the pins 5 and the test bolt. The test is carried out for a period of about 3 hours. The sliding contacts between pins 5 and bolts 6 are flooded with lubricating-cooling substances. During the test, vibration is considered; the friction at the beginning ($\mu A$) and at the end ($\mu E$) is measured. The temperature at the test stand at the beginning ($T_A$) and at the end ($T_E$) of the test is determined. After the test, the track made by the pins 5 is inspected.

If the surface is smooth and does not show any groove, then the lubricating effectiveness is good. A decreasing sliding friction ($\mu E < \mu A$) shows a good lubricating film. Comparison of the temperature at the beginning and at the end of the experiment indicates the cooling effectiveness. The temperature difference should be small.

THE ATTACHED TABLE III

The data of Table III show the results of the test, and comparison with known cooling fluids. Table III shows decreasing sliding friction, which is further indicated by the small degree of wear and the good aspect of the track made by the pins 5. Mineral oil based cutting oils, activated by additives, are initially better lubricants; but the much higher degree of heating, due to the smaller thermal capacity and cooling effectiveness of oils also decreases lubricating efficiency. In actual machining operation, heating of tools causes dulling and increases the necessity for resharpening.

The "commercial" cutting fluid of Table III item 2, is a water dispersable fluid in which the dilution of 1 to 40 is the limit of recommended use; the lubricating effectiveness at this dilution is already impaired.

The present invention thus provides reaction products which are water-soluble, water-emulsifiable and dispersable. They are corrosion inhibiting and useful as a cutting fluid in a metal working field; they combine the advantages of high lubricating effectiveness and corrosion inhibition of the mineral oil base cutting fluids with the high cooling efficiency of the water base cutting fluids. They do not have any of the disadvantages of either, however, namely, subject to decomposition or a necessity for poisonous additives. Additionally, the reaction products of the present invention provide cutting fluids which are bacteriostatic, and yet biologically degradable so that they can be disposed of readily without causing pollution. When used as detergents, the reaction products have excellent cleaning properties and are efficient emulsifiers and buffering agents. The property of biologic degradability, thus providing for case of disposal, likewise obtains when they are used as detergents.

I claim:

1. A boron- and nitrogen-containing condensation reaction product produced by reacting at least two molar proportions of a secondary aliphatic amino alcohol represented by the general formula:

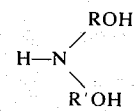

wherein each of R and R' contains from one to six carbon atoms with one molar proportion of a boron-containing component taken from the group consisting of boric acid, $HBO_2$, $H_2B_4O_7$ and $B_2O_3$ and their corresponding salts, esters and halogen compounds, at a temperature from about 130°C. to about 230°C. and removing the water of reaction formed thereby to yield an intermediate ester product, further reacting said intermediate ester product with a carboxylic acid selected from a group consisting of a monocarboxylic acid having from about 12 to about 22 carbon atoms, a tall oil acid, a naphthenic acid and a phthalic acid at an elevated temperature and for a time sufficient to form water of reaction and to yield said boron- and nitrogen-containing condensation product, and removing said water of reaction.

2. A product as defined by claim 1, wherein the aminoalcohol is diethanolamine.

3. A product as defined by claim 1, wherein the boron-containing compound is boric acid.

4. A product as defined by claim 1, wherein the carboxylic acid comprises tall oil.

5. A product as defined by claim 1, wherein from about 2 to about 4.5 molar proportions of said aminoalcohol is so reacted.

6. The condensation reaction product of claim 1 wherein the intermediate ester reaction is reacted with said carboxylic acid at a temperature from about 150°C. to about 230°C.

7. A process for the production of a boron- and nitrogen-containing condensation reaction product comprising:

reacting at least two molar proportions of a secondary aliphatic aminoalcohol represented by the general formula:

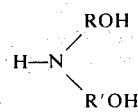

wherein each of R and R' contains from one to six carbon atoms, with one molar proportion of a boron-containing compound selected from the group consisting of boric acid, $HBO_2$, $H_2B_4O_7$ and $B_2O_3$ and their corresponding salts, esters and halogen compounds, at a temperature from about 130°C. to about 230°C.;

removing the water of reaction formed thereby to yield an intermediate ester product;

further reacting said intermediate ester product at an elevated temperature and for a time sufficient to form water of reaction and to yield said boron- and nitrogen-containing condensation product; and removing said water of reaction.

8. Process as defined by claim 7, wherein the aminoalcohol is diethanolamine.

9. Process as defined by claim 7, wherein the boron-containing compound is boric acid.

10. Process as defined by claim 7, wherein the carboxylic acid comprises tall oil.

11. Process as defined by claim 7, wherein from about 2 to about 4.5 molar proportions of said aminoalcohol is so reacted.

12. The process of claim 7 wherein the intermediate ester reaction product is reacted with said carboxylic acid at a temperature from about 150°C. to about 230°C.

* * * * *